United States Patent [19]
Nishiyama et al.

[11] Patent Number: 5,293,225
[45] Date of Patent: Mar. 8, 1994

[54] DIGITAL SIGNAL PROCESSING SYSTEM FOR COLOR CAMERA APPARATUS INCLUDING SEPARATE DELAYS FOR COLOR SIGNAL AND BRIGHTNESS SIGNAL PROCESSING

[75] Inventors: Hiroshi Nishiyama; Shozo Yokoyama; Masanori Kubota, all of Yokohama; Takashi Kiyofuji, Yokosuka; Mamoru Miyashita, Kitamoto, all of Japan

[73] Assignee: Victor Company of Japan, Ltd., Yokohama, Japan

[21] Appl. No.: 889,567

[22] Filed: May 28, 1992

[30] Foreign Application Priority Data

May 31, 1991 [JP] Japan .................................. 3-155368
Jun. 22, 1991 [JP] Japan .................................. 3-177639

[51] Int. Cl.⁵ ...................... H04N 9/07; H04N 9/077; H04N 9/04
[52] U.S. Cl. .................................. 348/242; 348/625; 348/256
[58] Field of Search .................. 358/41, 43, 44, 21 R, 358/31, 29, 32, 11, 36, 37, 96, 162; H04N 9/07, 9/077, 9/04, 5/208

[56] References Cited

U.S. PATENT DOCUMENTS

| | | | |
|---|---|---|---|
| 4,158,208 | 6/1979 | Dischert | 358/41 X |
| 4,620,222 | 10/1986 | Baba et al. | 358/44 |
| 5,170,249 | 12/1992 | Ohtsubo et al. | 358/41 |
| 5,182,636 | 1/1993 | Kikuchi et al. | 358/41 |

FOREIGN PATENT DOCUMENTS 59-86987 5/1984 Japan .
59-89091 5/1984 Japan .
59-181884 10/1984 Japan .

Primary Examiner—James J. Groody
Assistant Examiner—Safet Metjahic
Attorney, Agent, or Firm—Lowe, Price, Leblanc & Becker

[57] ABSTRACT

A color camera apparatus comprises an image pickup element having a stripe/mosaic type color filter and photo-electrically converting an arriving optical image so as to obtain at least a signal including a brightness component and a color component multiplexed with each other. And, the apparatus comprises an A/D converter for digitizing above multiplexed signal, and a brightness signal processing circuit which separates the brightness component from the multiplexed signal and carries out an aperture correction by means of a delay element having a delay amount corresponding to two horizontal scanning period. And further, the apparatus comprises a color signal processing circuit which separates the color component from the multiplexed signal so as to obtain two line-sequential color difference components through a predetermined arithmetic procedure. And, the color signal processing circuit not only carries out a circular-type noise removal processing operation by means of the delay element having the delay amount corresponding to two horizontal scanning periods, but carries out a rearrangement of said line-sequential color difference components by use of the same delay line.

8 Claims, 13 Drawing Sheets

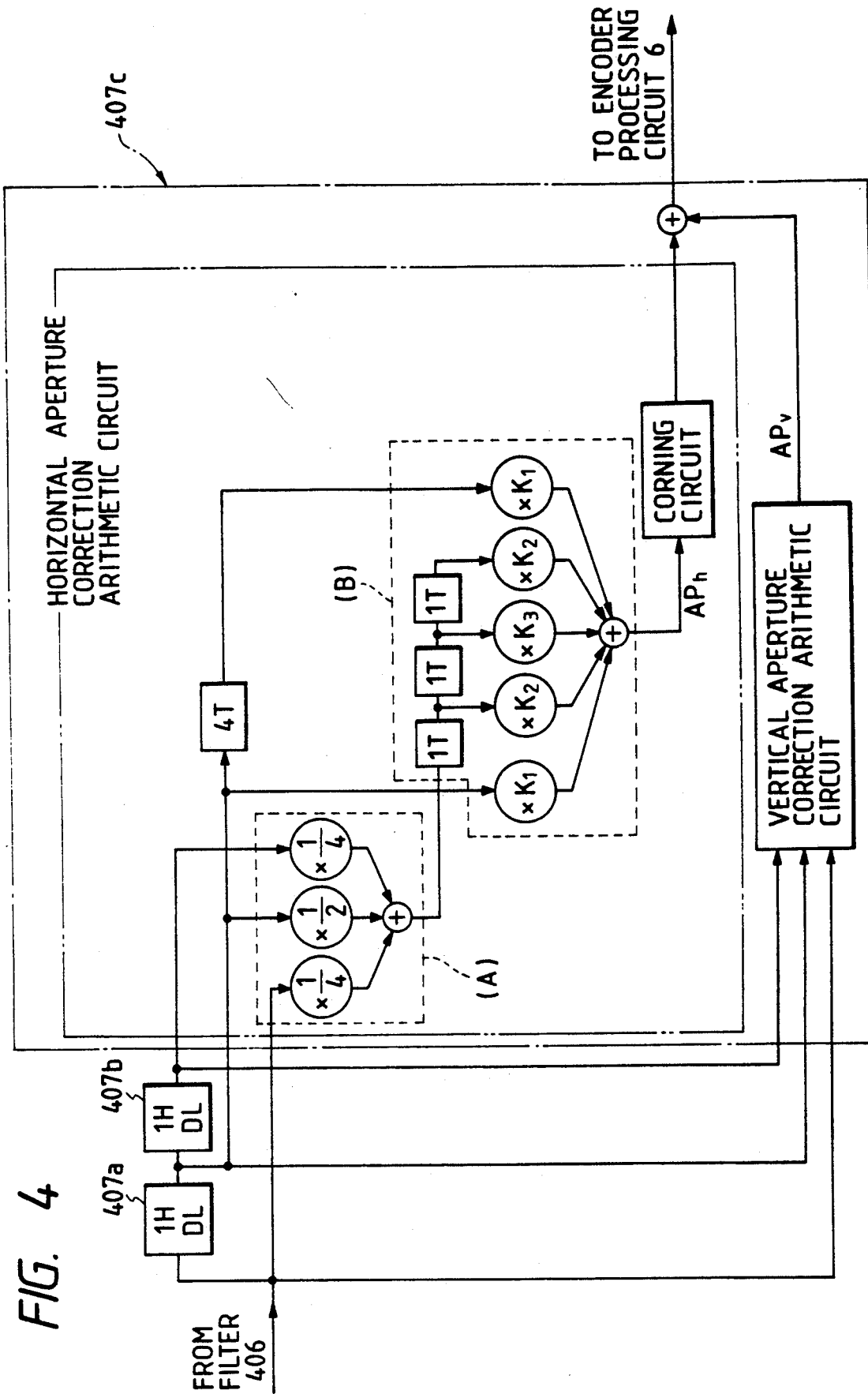

FIG. 8
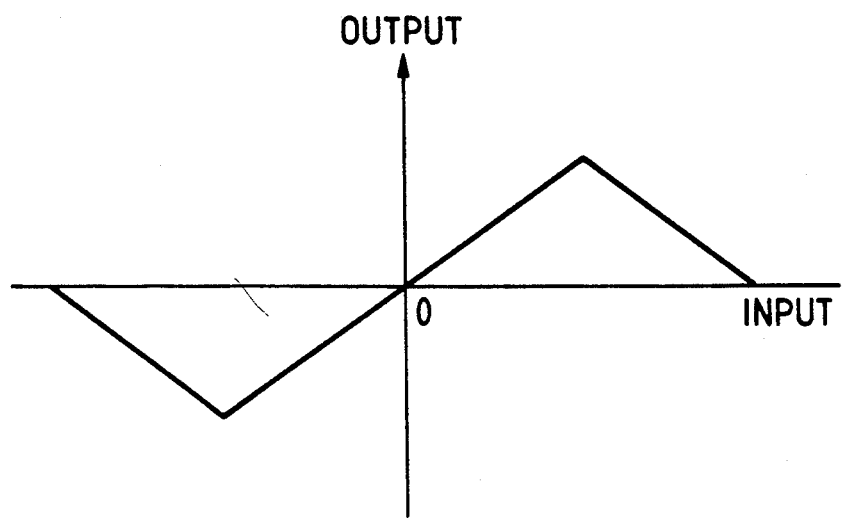
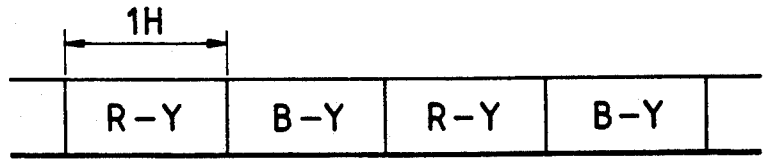
FIG. 9(A)
FIG. 9(B)
FIG. 9(C)
FIG. 9(D)
FIG. 9(E)
FIG. 9(F)

DIGITAL SIGNAL PROCESSING SYSTEM FOR COLOR CAMERA APPARATUS INCLUDING SEPARATE DELAYS FOR COLOR SIGNAL AND BRIGHTNESS SIGNAL PROCESSING

BACKGROUND OF THE INVENTION

1. Field of the Invention

The present invention relates to a digital signal processing for a TV camera, and more particularly to a digital signal processing system for a TV camera using a piece of solid image pickup element (for example, a charge coupled device; i.e. CCD) equipped with a color filter of mosaic/stripe type.

2. Description of the Prior Art

FIG. 15 shows a conventional example having a signal processing system using such an image pickup element. In the drawing, an image signal photoelectrically converted in a CCD 21 is subjected to a CDS processing (i.e.; a correlation double sampling processing), an AGC processing (i.e.; an automatic gain control), and a gamma correction in a circuit block 22. Then, the image signal is converted into a digital signal in an A/D converter circuit 23. The digitized signal is delayed by an amount of two horizontal scanning periods in a 2H delay circuit 24, and is fed in parallel to an LPF 25, a horizontal aperture processing circuit 26, a vertical aperture processing circuit 27, a false color suppression circuit 28, a white balance correction circuit 29, a picture plane division photometry circuit 30, and a brightness peak detecting circuit 31.

A brightness signal is separated in the LPF 25, and sent to an adder 32. On the other hand, an aperture correction component with respect to the brightness signal is produced in the horizontal aperture processing circuit 26, the vertical aperture processing circuit 27, an adder 33, a low brightness suppression processing circuit 34 and a highlight processing circuit 35 for applying corrections with respect to both a low-brightness and a high-brightness. In turn, the aperture correction component is added to the brightness signal in the adder 32.

The corrected brightness signal is sent to an D/A converter circuit 37 after having been applied an amplitude correction of a highlight portion in an auto-knee processing circuit 36.

On the other hand, a color signal outputted from the white balance correction circuit 29 is fed to a color separation time-sharing circuit 38 and, subsequently, added to a color difference matrix circuit 42 via a gain control circuit 39, an LPF 40, and a color difference clamp circuit 41. Then, thus line-sequentially obtained color signal becomes a regular color difference signal by being rearranged in a rearrangement process by use of a delay line, and sent to the D/A converter circuit 37.

The false color suppression circuit 28 detects an appearance of a false color, and suppresses the false color signal by controlling the gain control circuit 39 on the basis of the result of the detection.

Both the picture plane division photometry circuit 30 and the brightness peak detecting circuit 31 measure quantities relating to photo receiving condition on an image pickup surface. A micro computer 43 is connected to these picture plane division photometry circuit 30 and the brightness peak detecting circuit 31 through a data bus 44 to monitor and control the measuring results and conditions of above-described respective circuit blocks. Consequently, a brightness signal and a color signal, both processed in the optimum way, are outputted from the D/A converter circuit 37 after having converted into analogue signals therein.

In this manner, functions required for processing TV camera signals normally include various functions such as an aperture correction, a black level/highlight level setting, a direct current reproduction, a gamma correction, a noise removal etc.

Especially, since an aperture correction in a horizontal direction requires the signal delay equivalent to two horizontal scanning periods, it is noted that its signal processing order should be carefully determined.

Furthermore, the signals of image pickup element having a color mosaic filter, which is an object of the present invention, include brightness signals and color signals multiplexed together. Therefore, a function for separating both signals, and a function for rearranging separated line-sequential color signals simultaneously by use of the delay line are required. Furthermore, in this case, what kind of order should be applied to process these functions becomes the maximum problem in a system constitution.

SUMMARY OF THE INVENTION

The present invention has a purpose, in view of above problems and disadvantages encountered in the conventional art, to provide a processing system having a novel constitution enabling a color signal to process a circular-type noise removal by separating one delay processing operation required for an aperture processing and another delay processing operation required for a rearrangement of the color signal.

To this end, the present invention provides a color camera apparatus comprising: an image pickup element having a stripe/mosaic type color filter and photo-electrically converting an arriving optical image so as to obtain at least a signal including a brightness component and a color component multiplexed with each other; an A/D converter for digitizing said multiplexed signal; a brightness signal processing circuit which separates the brightness component from the multiplexed signal and carries out an aperture correction by means of a delay element having a delay amount corresponding to two horizontal scanning periods; and a color signal processing circuit which separates the color component from the multiplexed signal so as to obtain two line-sequential color difference components through a predetermined arithmetic procedure, and said color signal processing circuit not only carrying out a circular-type noise removal processing operation by means of the delay element having the delay amount corresponding to two horizontal scanning periods but carrying out a rearrangement of said line-sequential color difference components at the same timing by use of the same delay line.

Furthermore, the present invention provides a color camera apparatus further comprising an arithmetic circuit which receives a plurality of signals from said brightness signal processing circuit and said color signal processing circuit and, in turn, calculates these signals with respect to not only each small segment of a picture plane but a whole picture plane so as to obtain data representing a picture plane condition during a photographing operation.

Moreover, the present invention provides a color camera apparatus further including a micro computer which is connected via a data bus to each of said arithmetic circuit, said brightness signal processing circuit, and a color signal processing circuit, and said micro computer producing various coefficients to be used in said brightness signal processing circuit and said color signal processing circuit on the basis of calculation result in said arithmetic circuit received via said data bus, and transmitting these coefficients via said data bus to said brightness signal processing circuit and said color signal processing circuit so as to control respective processing operations.

Still further, the present invention provides a color camera apparatus in which said respective processing circuits maintain said coefficients so as to allow a standard processing operation representing a standard photographing condition, and are constituted so as to carry out respective processing operations based on said maintained coefficients in the case where said data bus and said respective processing circuits are disconnected with each other.

The above and other objects, features and advantages of the present invention will become more apparent from the following detailed description which is to be read in conjunction with the accompanying drawings.

BRIEF DESCRIPTION OF THE DRAWINGS

FIG. 4 is a view showing a detail constitution of an arithmetic circuit for a horizontal aperture correction in accordance with the present invention;

FIG. 8 is a view showing an input/output characteristic of a mute circuit in accordance with the present invention;

FIGS. 9A-9F are views showing waveforms of various portions in the interpolation/color signal noise removal circuit in accordance with the present invention;

DETAILED DESCRIPTION OF THE PREFERRED EMBODIMENT

Hereinafter, referring now to the accompanying drawings, an embodiment of the present invention is explained in detail.

1. OVERALL SYSTEM

Figure 1:
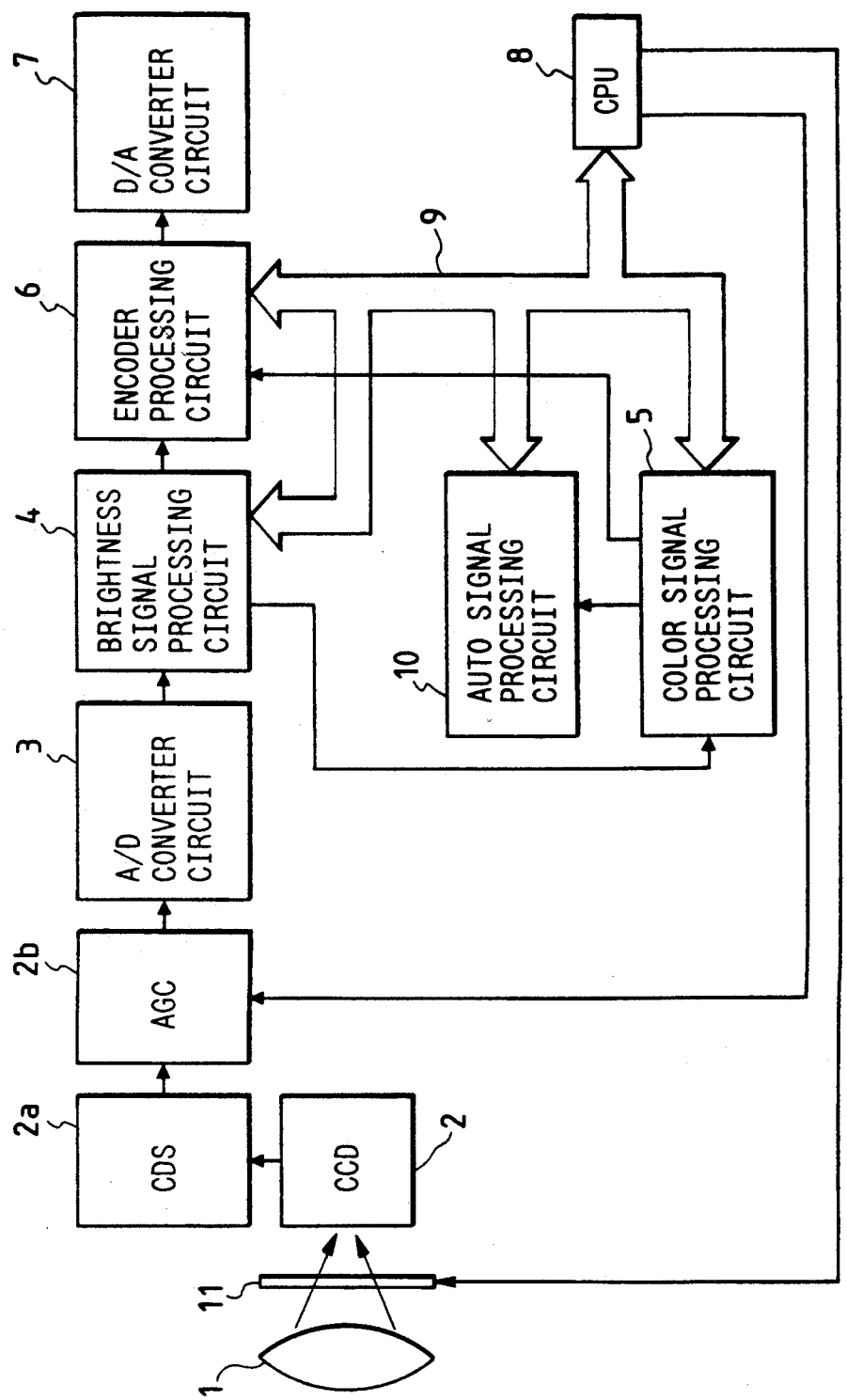
FIG. 1 is a schematic block diagram in accordance with the present invention.

FIG. 1 is a schematic block diagram showing a signal processing system for a color camera in accordance with the present invention. In the drawing, a reference numeral 1 denotes a lens system. An optical image outputted from the lens system 1 enters through an iris diaphragm 11 into a solid image pickup element (e.g. CCD) 2 and, in turn, photoelectrically converted therein. Since there is provided a color filter on the image pickup element 2, the photoelectrically converted signal includes both a brightness signal and a color signal, multiplexed with each other.

This signal is fed through a CDS circuit 2a and an AGC circuit 2b into an A/D converter circuit 3, and digitized therein into a digital signal. In a brightness signal processing circuit 4, a later described predetermined signal processing is carried out. A signal separated in the brightness signal processing circuit 4 is fed into a color signal processing circuit 5 to carry out a later described predetermined signal processing.

A color signal processed in the color signal processing circuit 5 is sent together with the brightness signal obtained in the brightness signal processing circuit 4 into an encoder processing circuit 6. In the encoder processing circuit 6, a later described encoder processing is carried out. In turn, the signal processed in the encoder processing circuit 6 is fed to a D/A converter circuit 7 and returned to an analogue signal therein.

Figure 15:
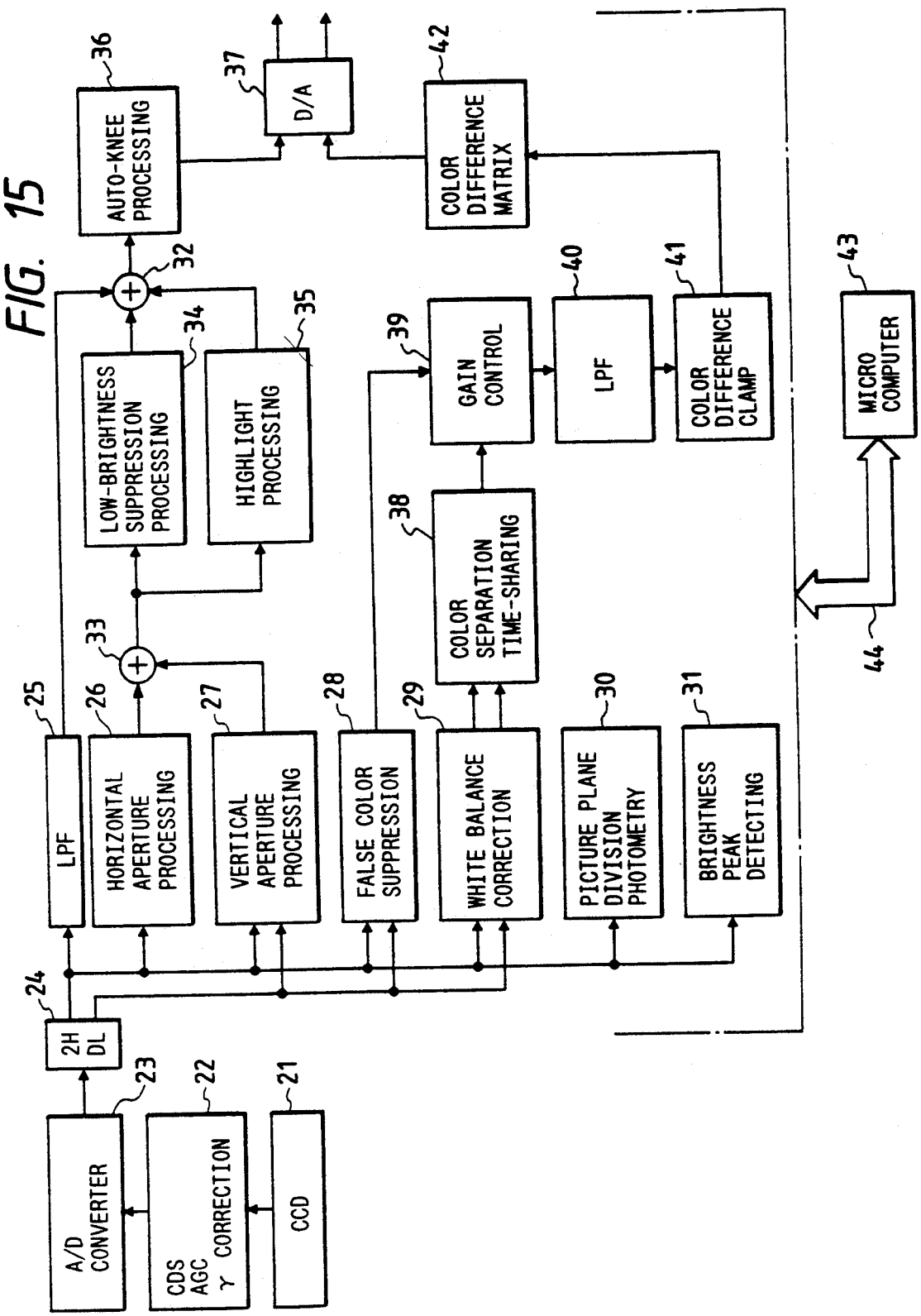
FIG. 15 is a block diagram showing a conventional example of signal processing system.

An auto signal processing circuit 10 has functions equivalent to both the picture plane division photometry circuit 30 and the brightness peak detecting circuit 31 shown in the conventional example of FIG. 15. The auto signal processing circuit 10 receives presently processing signal amplitude data from the brightness signal processing circuit 4 and the color signal processing circuit 5, and outputs system control data to a micro computer 8 via a data bus 9.

Further, the data bus 9 is also connected to the brightness signal processing circuit 4, the color signal processing circuit 5, and the encoder processing circuit 6, so that signal conditions of various portions can be transmitted to the micro computer 8 and, to the contrary, the micro computer 8 can control respective processing circuits.

2. BRIGHTNESS SIGNAL PROCESSING CIRCUIT

Figure 2:
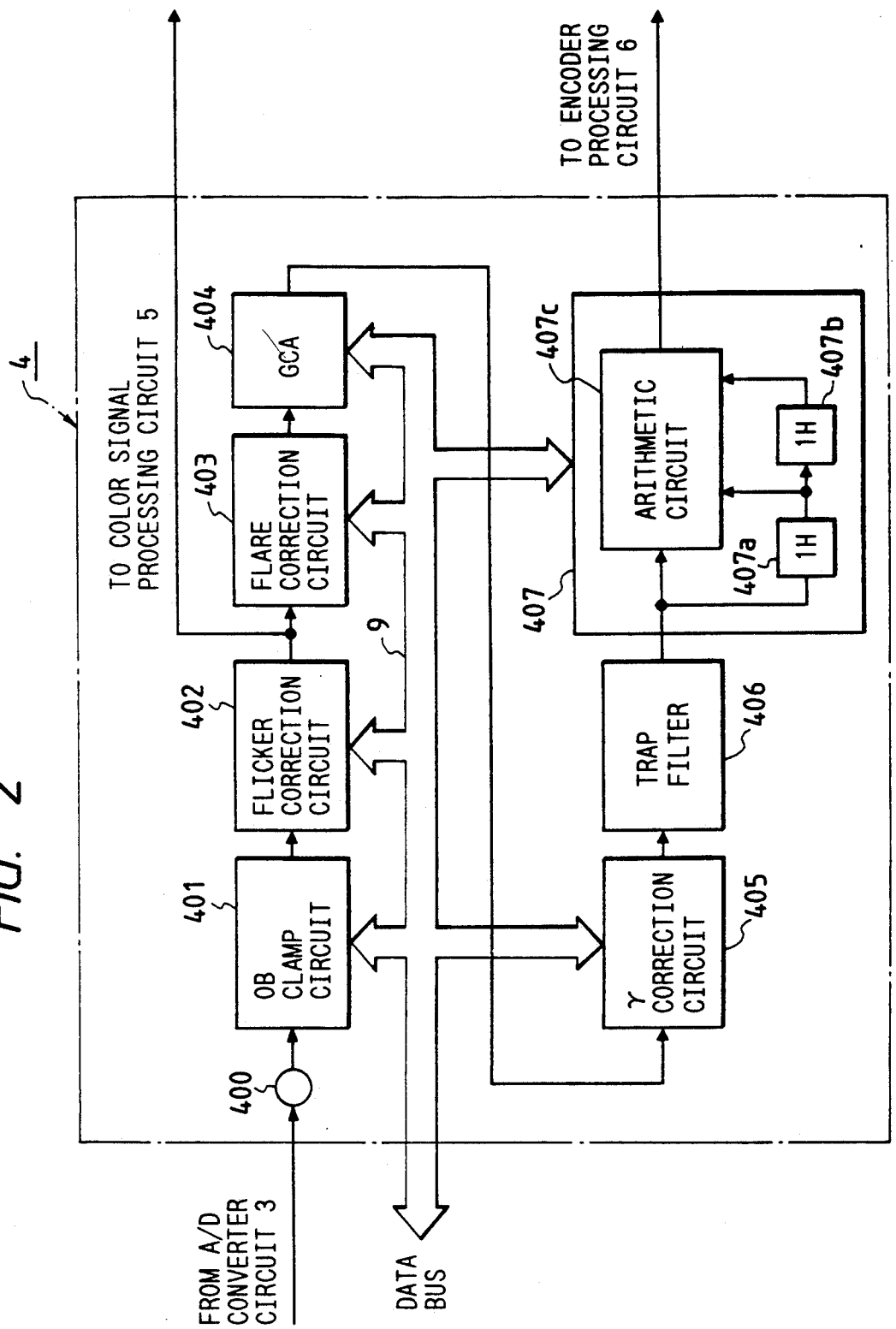
FIG. 2 is a block diagram showing a detail constitution of a brightness signal processing circuit in accordance with the present invention.

FIG. 2 is a block diagram showing a detail constitution of the brightness signal processing circuit 4. In the drawing, a digitized signal is supplied from the A/D converter 3 to an input terminal 400. This signal is clamped into a predetermined optical black level in an OB clamp circuit 401 and, then, sent to a flicker correction circuit 402.

An output of the flicker correction circuit 402 is sent, on one hand, to the color signal processing circuit 5 and, on the other hand, to a flare correction circuit 403. In these flicker correction circuit 402 and flare correction circuit 403, a flicker component and a flare component of the signal outputted from the OB clamp circuit 401 can be removed.

The signal outputted from the flare correction circuit 403 is fed through a gain control circuit 404 into a gamma correction circuit 405 so as to apply a gamma correction. Then, the signal is inputted into an aperture correction circuit 407 after a color component of the signal has been removed in a trap filter 406.

The aperture correction circuit 407 consists essentially of a pair of delay line 407a and 407b each giving a delay of one horizontal scanning period, and an arithmetic circuit 407c which carries out calculations with respect to three signals of a non-delayed signal, an 1H-delayed signal delayed by the delay line 407a, and a 2H-delayed signal delayed by the delay lines 407a and 407b.

Figure 3A:
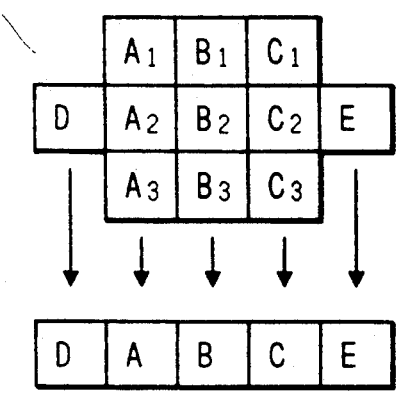
FIGS. 3(A) and 3(B) are views showing layouts of picture elements relating to aperture corrections in accordance with the present invention.
Figure 3B:
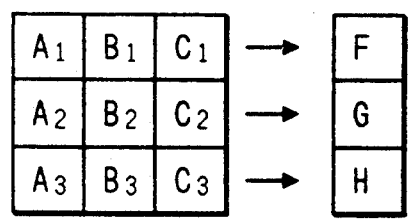

FIGS. 3(A) and 3(B) illustrate correlation of picture elements relating to arithmetic process on the picture plane. In this case, an object of correction is a picture element B2.

FIG. 3(A) shows an exemplary case illustrating a horizontal aperture correction. And, its calculation process is carried out as follows.

With respect to picture elements A1, A2, and A3, the calculation is carried out in accordance with the following equation (1).

$$A = \{A2 + (A1 + A3)/2\}/2 \tag{1}$$

In the same manner, with respect to picture elements B1, B2, and B3, the calculation is carried out in accordance with the following equation (2).

$$B = \{B2 + (B1 + B3)/2\}/2 \tag{2}$$

And further, with respect to picture elements C1, C2, and C3, the calculation is carried out in accordance with the following equation (3).

$$C = \{C2 + (C1 + C3)/2\}/2 \tag{3}$$

Next, a horizontal aperture correction value APh is obtained on the basis of the data A, B, C, D, and E derived from foregoing calculations by multiplying coefficients K1, K2, and K3 as follows.

$$APh = (D + E) \cdot K1 + (A + C) \cdot K2 + B \cdot K3 \tag{4}$$

On the other hand, FIG. 3(B) shows an exemplary case for illustrating a vertical aperture correction. And, its calculation process is carried out as follows.

With respect to picture elements A1, B1, and C1, the calculation is carried out in accordance with the following equation (5).

$$F = \{B1 + (A1 + C1)/2\}/2 \tag{5}$$

In the same manner, with respect to picture elements A2, B2, and C2, the calculation is carried out in accordance with the following equation (6).

$$G = \{B2 + (A2 + C2)/2\}/2 \tag{6}$$

And further, with respect to picture elements A3, B3, and C3, the calculation is carried out in accordance with the following equation (7).

$$H = \{B3 + (A3 + C3)/2\}/2 \tag{7}$$

Subsequently, a vertical aperture correction value APv is obtained on the basis of the data F, G, and H derived from the foregoing calculations by multiplying coefficients K4, and K5 as follows.

$$APv = (F + H) \cdot K4 + G \cdot K5 \tag{8}$$

Hereupon, values of the aperture correction coefficients K1~K5 are determined, for example, −0.5, −1, 3, −1, 2, respectively.

Figure 5:
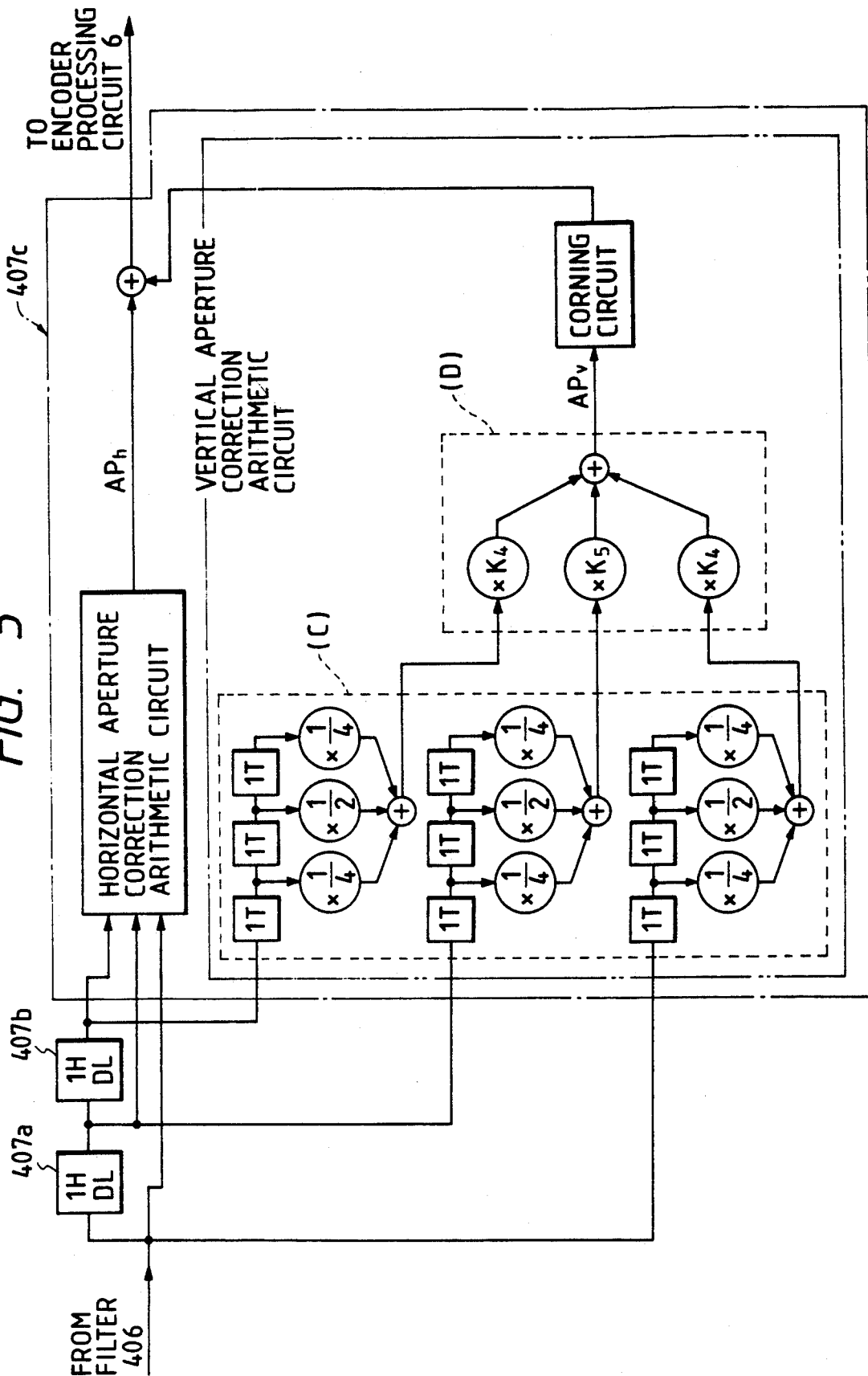
FIG. 5 is a view showing a detail constitution of an arithmetic circuit for a vertical aperture correction in accordance with the present invention.

Furthermore, detail arithmetic constitution is shown in FIGS. 4 and 5. In FIG. 4, a part (A) corresponds to above calculations in accordance with the equations (1) to (3), and a part (B) corresponds to the calculation in accordance with the equation (4). Similarly, in FIG. 5, a part (C) corresponds to above calculations in accordance with the equations (5) to (7), and a part (D) corresponds to the calculation in accordance with the equation (8).

And, in the drawings, symbols "T" and "H" show delay elements having delay amounts corresponding to one picture element and one scanning period, respectively.

Thus obtained horizontal and vertical aperture correction values APh and APv are added and, in turn, sent to the encoder processing circuit 6. The method disclosed in this embodiment is characterized in that it uses diagonal or oblique picture elements such as A1, A3, C1, and C3 to calculate correction values. Therefore, resolution in a diagonal or oblique direction can be improved.

3. COLOR SIGNAL PROCESSING CIRCUIT

Figure 6:
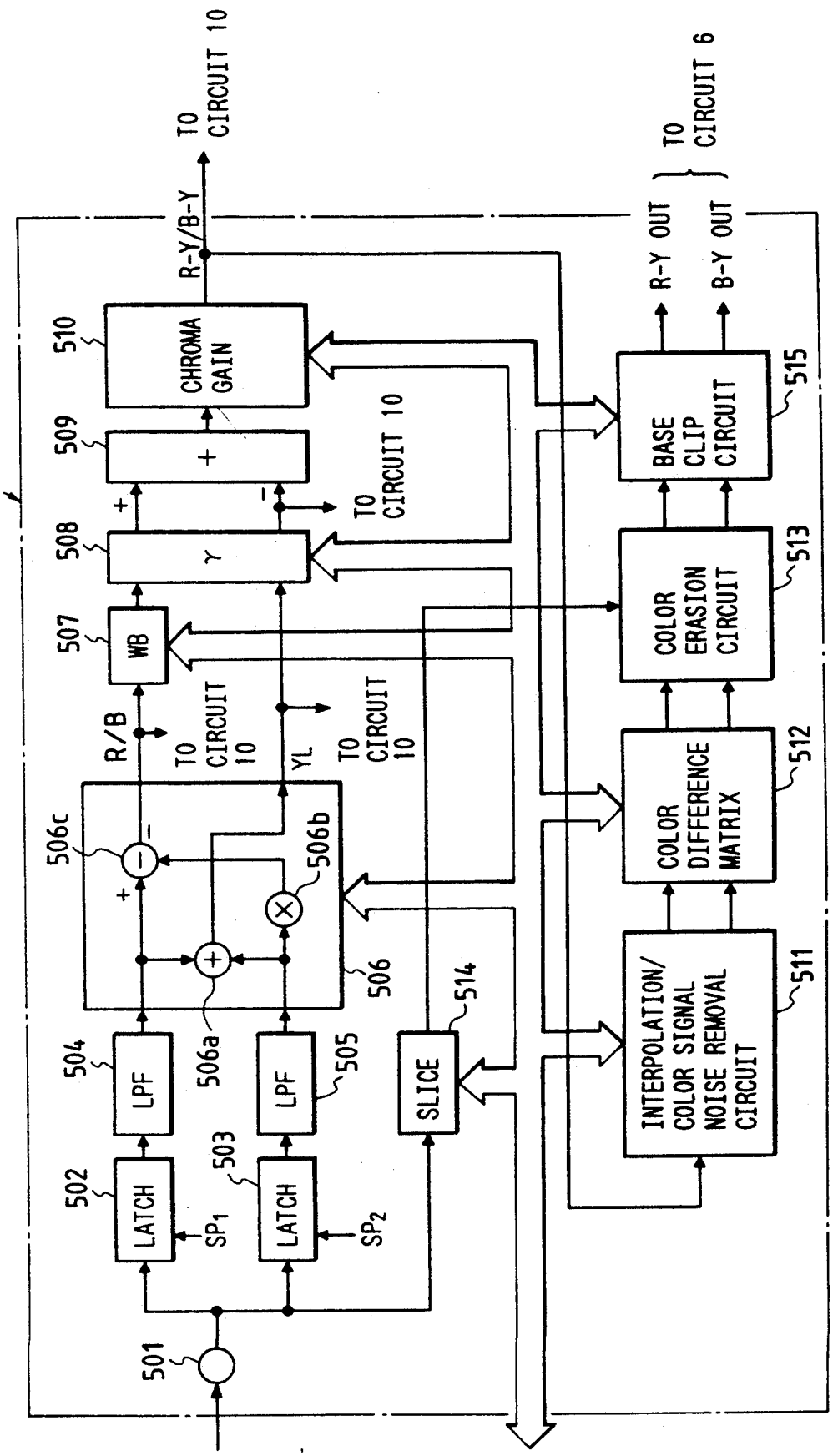
FIG. 6 is a block diagram showing a detail constitution of a color signal processing circuit in accordance with the present invention.

FIG. 6 is a block diagram showing the color signal processing circuit 5. In the drawing, an input terminal 501 is supplied with a signal separated from the flicker correction circuit 402. The inputted signal is fed to latch circuits 502 and 503, and alternately latched therein by use of sampling pulses SP1 and SP2. These sampling pulses SP1 and SP2 have a half frequency of a sampling clock for a picture element, and have a 180-degree phase difference with each other.

As a result, each latch circuit outputs a signal including two picture elements every time. That is, respective two picture elements read out each time by these latch circuits are mutually shifted by one picture element in a horizontal scanning direction. In other words, these latch circuits 502 and 503 are alternately and successively reading out two picture elements every time by shifting picture elements one by one.

The signals read out in the latch circuits 502 and 503 are sent to LPF circuits 504 and 505 to separate color signal components from other components based on their frequencies and, subsequently, sent to a color signal separation circuit 506 and added with each other in an adder 506a so as to generate a narrow-band brightness signal YL. This narrow-band brightness signal YL is supplied to both a gamma correction circuit 508 and a later-described auto signal processing circuit 10.

On the other hand, a signal outputted from the LPF circuit 505 is also fed to a multiplier 506b and applied a calculation based on a predetermined coefficient. Then, after having finished above calculation, the signal is supplied to a subtracter 506c. In the subtracter 506c, an output signal fed from the LPF circuit 504 is subtracted by an output signal of the multiplier 506b so as to generate a color signal of R or B (which depends on each scanning line). The signal obtained in the subtracter 506c is, in turn, sent to both a white balance circuit 507 which performs a white balance adjustment and the auto signal processing circuit 10.

After having been adjusted in the white balance circuit 507, the color signal (R/B) is added to a gamma correction circuit 508 so that the color signal (R/B) can be applied a gamma correction together with the narrow-band brightness signal (YL). Then, the color signal (R/B) is fed to a mixing circuit 509. On the other hand, the narrow-band brightness signal (YL) is fed not only to the mixing circuit 509 but to the auto signal processing circuit 10.

In the mixing circuit 509, by subtracting the narrow-band brightness signal (YL) from the color signal (R/B), a line-sequential color difference signal R-Y or B-Y is obtained. Produced color difference signal (R-Y/B-Y) is carried out an amplitude adjustment in a chroma gain circuit 510 and, subsequently, sent to both the auto signal processing circuit 10 and an interpolation/color signal noise removal circuit (i.e. a rearrangement circuit) 511.

The interpolation/color signal noise removal circuit (i.e. the rearrangement circuit) 511 has functions not only to convert the line-sequentially produced color difference signals to simultaneous color difference signals by use of a delay line, but to selectively interpolate the color difference signal in a vertical direction by use of the same delay line or remove a noise component from the color difference signal.

3.1 INTERPOLATION/COLOR SIGNAL NOISE REMOVAL CIRCUIT

Figure 7:
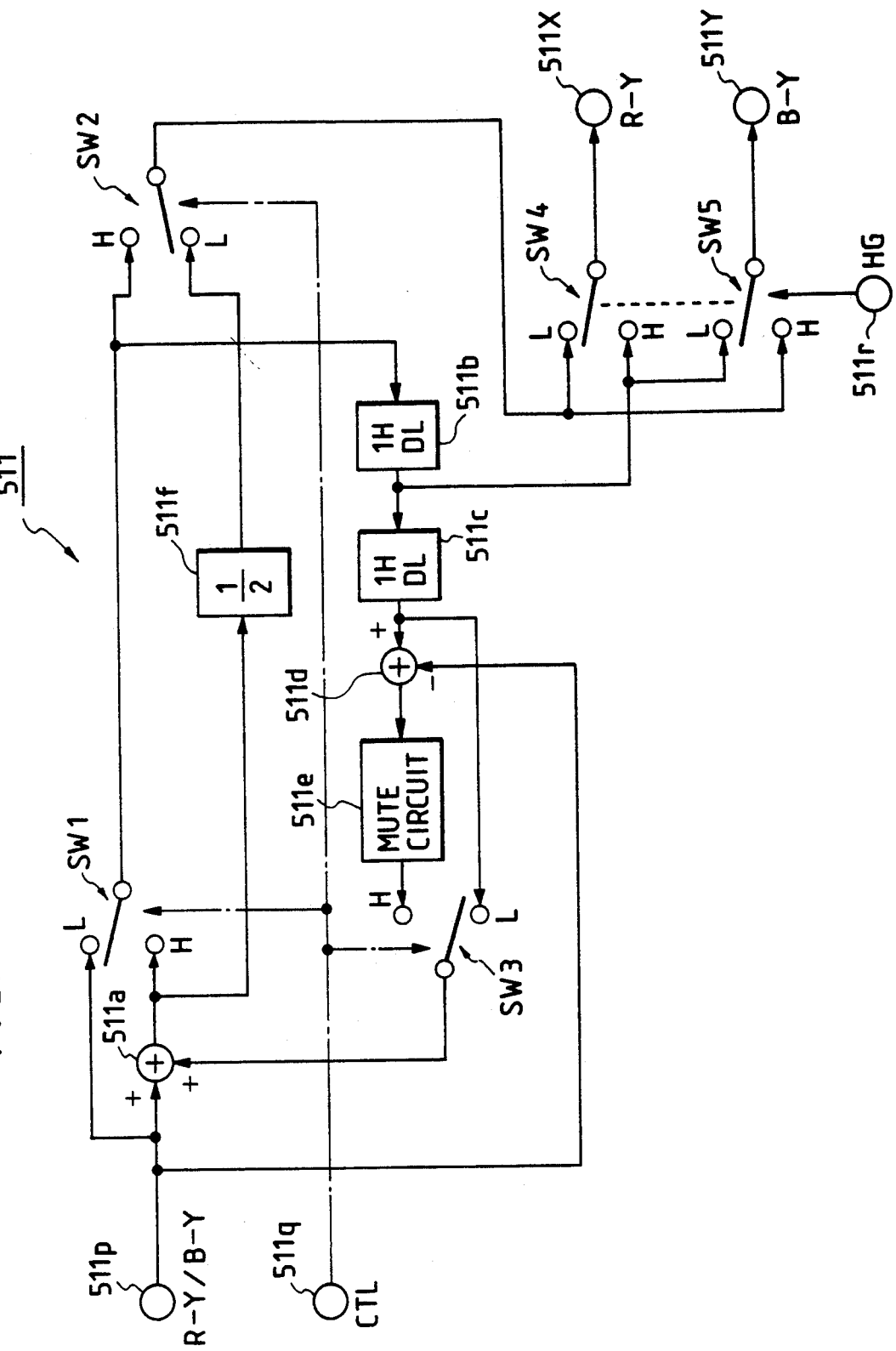
FIG. 7 is a block diagram showing a detail constitution of an interpolation/color signal noise removal circuit in accordance with the present invention.

FIG. 7 shows a block diagram of the interpolation/color signal noise removal circuit (i.e. the rearrangement circuit) 511. In the drawing, a line-sequential color difference signal is inputted to a terminal 511p from the chroma gain circuit 510. And, rearrangement color difference signals R−Y and B−Y are outputted from terminals 511x and 511y, respectively. A terminal 511q is supplied with a control signal CTL for controlling switches SW1, SW2, and SW3. These switches SW1, SW2, and SW3 are provided to alternately change over the above-described function of this circuit 511 between the interpolation of the color difference signal in the vertical direction and the noise removal of the color difference signal.

On the other hand, a terminal 511r is supplied with a control signal HG for changing over switches SW4 and SW5 at every horizontal scanning period. These switches SW4 and SW5 are used for rearranging the line-sequential color difference signals simultaneously. Furthermore, a mute circuit 511e responds linearly against a small amplitude signal but gives affection to a large amplitude so as to reduce it. FIG. 8 shows a specific input/output characteristic of the mute circuit 511e. And, a ½ circuit 511f functions to reduce its input to a half value.

(A) OPERATION IN THE CASE THE NOISE REMOVAL FUNCTION IS SELECTED

Figure 10:
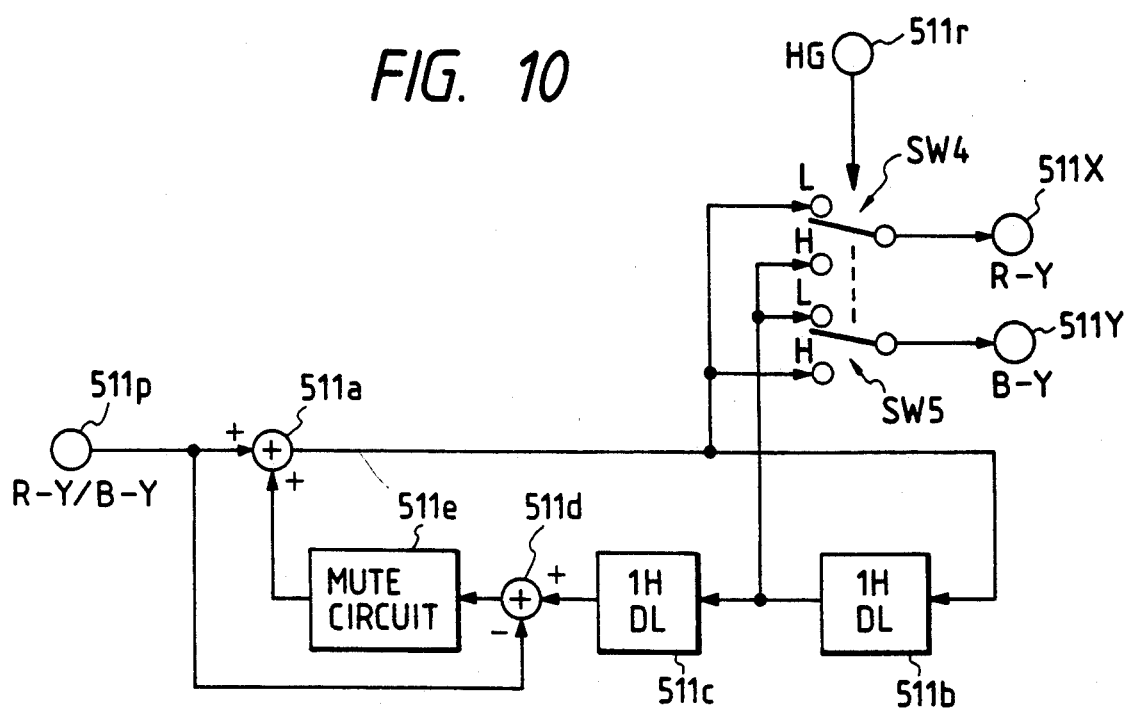
FIG. 10 is a circuit diagram showing an actual circuit constitution in a color signal noise removal operation.

In this case, according to the control signal CTL fed to the terminal 511q, the switches SW1, SW2, and SW3 are all changed over to "H" contacts. Accordingly, the ½ circuit is excluded out of the circuit, and the circuit is substantially constituted as shown in FIG. 10.

Now, if an input signal of the terminal 511p is supposed to be a signal (A) shown in FIG. 9, signals having passed 1H delay circuits 511b and 511c become signals (B) and (C), respectively.

Next, in a subtracter 511d, the input signal (i.e., the signal (A) in FIG. 9) is subtracted by the 2H delayed signal (i.e. the signal (C) in FIG. 9). By this substraction, components which have not recognized correlation between both signals are inputted into the mute circuit 511e.

Since the mute circuit 511e has the input/output characteristic shown in FIG. 8, small amplitude signals are linearly outputted from the mute circuit 511e but large amplitude signals are suppressed at a certain degree. That is, a small amplitude signal having no correlation between above-described both signals is judged as a noise component and added directly to an adder 511a. To the contrary, a large amplitude signal is judged as a meaningful signal; for example, in such a case where a color is changed during two horizontal scanning periods 2H, and suppressed its output.

Hereupon, the noise component outputted to the adder 511a is already inverted its polarity through the process in the subtracter 511d. Therefore, in the adder 511a, the input signal is subtracted by this noise component. Thus, the noise removal from the input signal is carried out in this manner. It should be noted that this noise removal circuit constitutes a circular loop which can enhance noise removal effect.

In this instance, the same signal as that of the input terminal 511p appears on a "L" contact of the switch SW4 and a "H" contact of the switch SW5. On the other hand, the 1H delayed signal of the input terminal 511p appears on a "H" contact of the switch SW4 and a "L" contact of the switch SW5.

Accordingly, if the switches SW4 and SW5 are selectively controlled at the same timing in such a manner that the switch SW4 is changed over to "L" contact and the switch SW5 is changed over to "L" contact during one horizontal scanning period in which a signal R−Y is inputted in the input terminal 511p and, to the contrary, the switch SW4 is changed over to "H" contact and the switch SW5 is changed over to "H" contact during a next horizontal scanning period in which a signal B−Y is inputted in the input terminal 511p, the output terminals 511x and 511y can continuously and simultaneously output the R−Y signal and the B−Y signal, respectively, as shown in FIG. 9 by signals (E) and (F).

For example, if the switches SW4 and SW5 are supposed to select "H" contacts when the control signal HG of the input terminal 511r is "H", a specific condition of the control signal HG becomes like a signal (D) in FIG. 9.

(B) OPERATION IN THE CASE THE VERTICAL INTERPOLATION FUNCTION IS SELECTED

Figure 11:
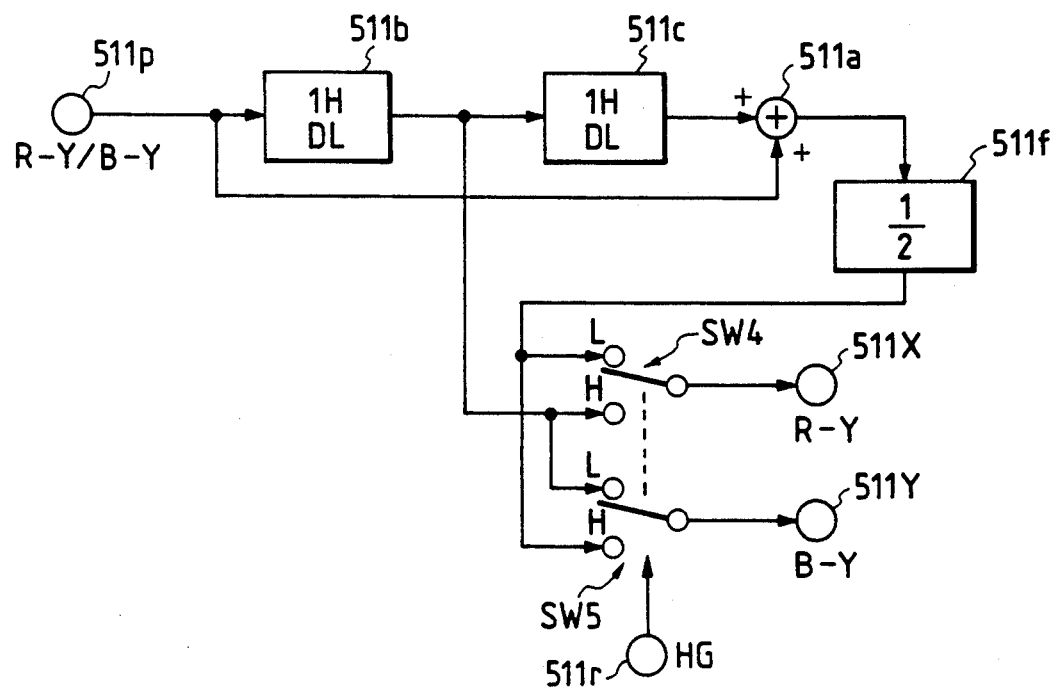
FIG. 11 is a circuit diagram showing an actual circuit constitution in a vertical interpolation operation.

In this case, the signal to the terminal 511q is inverted and the switches SW1, SW2, and SW3 are changed over to opposite sides. As a result, the mute circuit 511e and the adder 511d are excluded out of the circuit, and the circuit is substantially constituted as shown in FIG. 11.

As is the same as previous case, if the signal supplied to the input terminal 511p is supposed to be the signal (A) in FIG. 9, the 1H delayed signal (B) delayed in the 1H delay circuit 511b appears on the "H" contact of the switch SW4 and the "L" contact of the switch SW5.

This signal is further delayed in the 1H delay circuit 511c, and the signal (C) of FIG. 9 is fed to the adder 511a and added with the input signal (A) of the input terminal 511p.

The result of this addition is an addition of two signals in which one signal is delayed from another by two horizontal scanning periods. Therefore, 2(R−Y) and 2(B−Y) are alternately outputted. This signal is reduced its amplitude to be a half value in the ½ circuit 511f and, in turn, sent to the "L" contact of the switch SW4 and the "H" contact of the switch SW5.

Accordingly, if these switches SW4 and SW5 are controlled by the control signal (D) of FIG. 9 in the same way as the previous case, the output terminals 511x and 511y output R−Y and B−Y, respectively. In this case, the output R−Y and/or B−Y are outputted as an average value between one horizontal scanning line and its upper or lower horizontal scanning line. It is different from the previous case in that the previous case outputs either of the R−Y and B−Y directly. By this operation, the interpolation in the vertical direction is completed. And, the resolution in the vertical direction can be improved.

Thus rearranged color difference signal is successively sent to a color difference matrix 512, a color erasion circuit 513, and a base clip circuit 515 so as to apply predetermined processes therein. After having received processes in the color difference matrix 512, the color erasion circuit 513, and the base clip circuit 515, the output signal is fed to the encoder circuit 6.

The color difference matrix 512 performs a color correction on the basis of matrix calculation of two color difference signals, so as to produce a color difference signal in compliance with NTSC regulation. On the other hand, the color erasion circuit 513 suppresses the amplitude of the color difference signal at the high brightness portion, so as to suppress a so-called false color signal. Its action is determined based on a decision whether or not the signal inputted to the terminal 501 exceeds a slice level of a slicer 514. Furthermore, the base clip circuit 515 performs a process of cutting off the portion near the zero-level of passing signals in order to remove the noise of the low-brightness portion.

The signals from the base clip circuit 515 are sent to the encoder processing circuit 6, and encoded into composite video signals together with the brightness signals outputted from the brightness signal processing circuit 4. And further, after returned to analogue signals in the D/A converter circuit 7, they are outputted, for example, to a TV.

4. AUTO SIGNAL PROCESSING CIRCUIT

Figure 12:
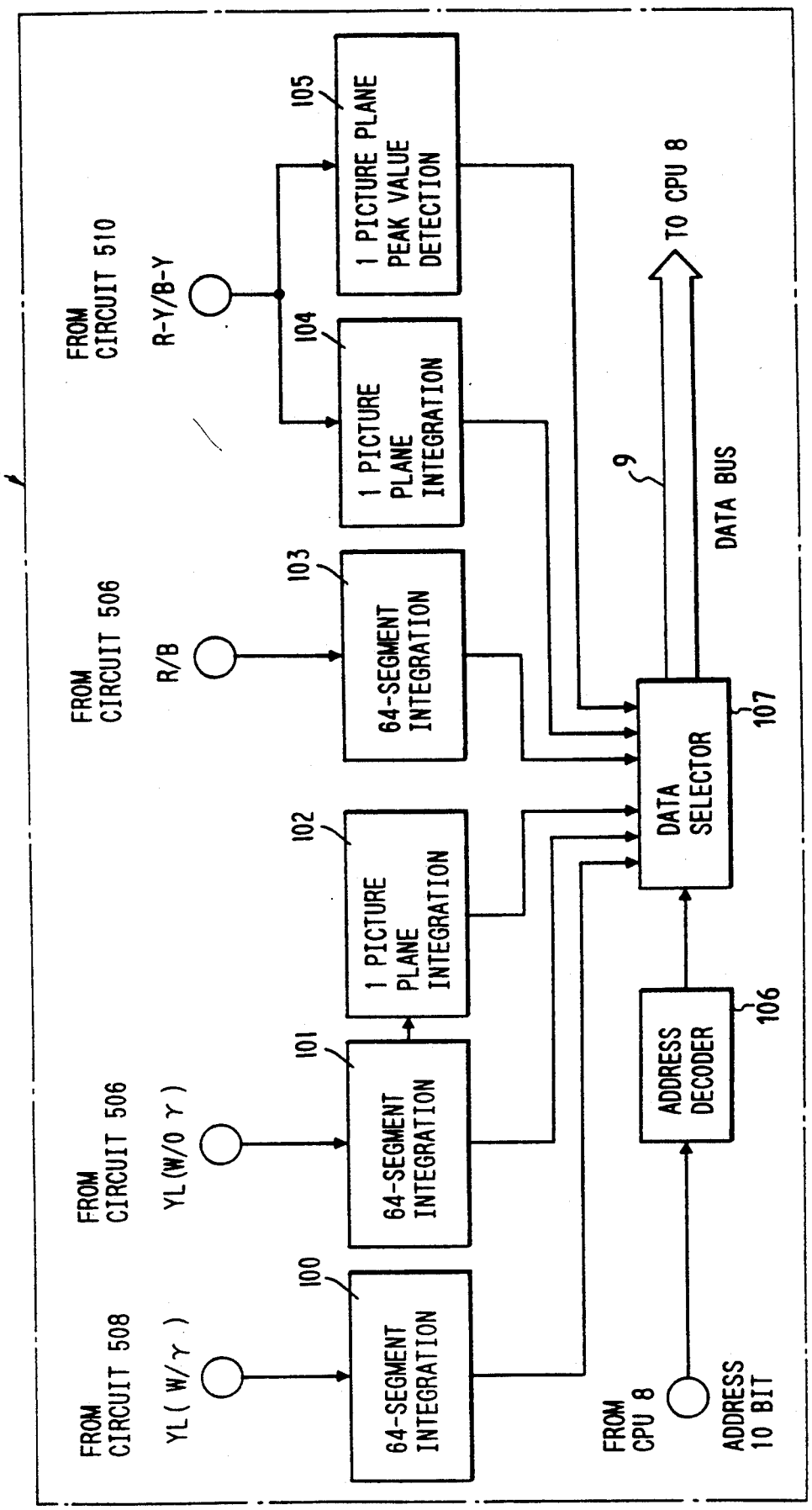
FIG. 12 is a block diagram showing a detail constitution of an auto signal processing circuit.

FIG. 12 shows a block diagram of the auto signal processing circuit 10. In a 64-segment integration circuit 100, a brightness signal data having corrected in the gamma correction circuit 508 is integrated in each of 64 small blocks on a picture plane. Integration result in respective blocks are utilized as control signals for an auto iris control, an auto gain control, and an auto flare correction.

A 64-segment integration circuit 101 carries out the similar integration by using the brightness signals not having been corrected in the gamma correction circuit 508. Its result is utilized for the open-loop white balance control together with the result obtained in a later-described 64-segment integration circuit 103.

The integration result in the 64-segment integration circuit 101 is also sent to one picture plane integration circuit 102 so as to integrate the picture plane as a whole. An output signal of the one picture plane integration circuit 102 is used as a correction data for the auto flicker correction.

Furthermore, the 64-segment integration circuit 103 carries out the similar integration on the basis of R/B signals which are line-sequentially supplied from the color separation circuit 506. Its integration result is utilized for the previously described white balance control.

Moreover, one picture plane integration circuit 104 integrates R−Y and B−Y signals supplied from the chroma gain circuit 510 at the whole picture plane, so as to obtain an integration value for the auto white balance control. Yet further, one picture plane peak value detector 105 detects a peak value in the picture plane from the R−Y and B−Y signals. And, its result is used as auxiliary data for the previous described auto iris control.

Above explained various integration/detection results are once fed to respective input ports of a data selector 107. An output port of the data selector 107 is connected to the data bus 9 of the micro computer 8. To the contrary, a port designating address sent from the micro computer 8 through a control line (which is either an exclusive line or a part of the bus 9) is given to the data selector 107 through an address decoder 106, so that a desired integration result can be inputted into the micro computer 8 by adequately switching the input ports. The micro computer 8 calculates control data for controlling various portions of the system on the basis of thus taken integration/detection results, and outputs them via the data bus 9.

Figure 13:
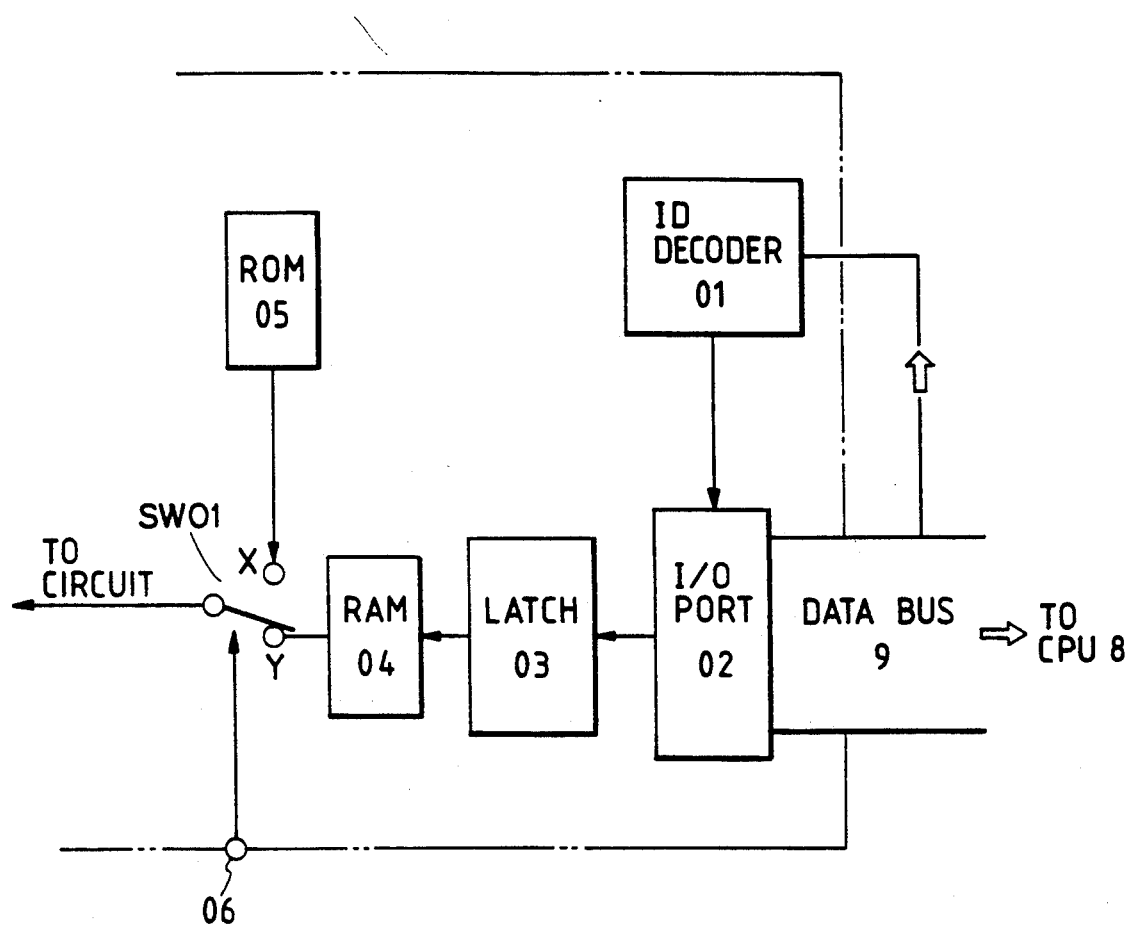
FIG. 13 is a view showing a detail constitution of a data input portion of a control object circuit block in a CPU.

A data input portion of the circuit block receiving above data is shown in FIG. 13. In the drawing, an ID decoder 01 discriminates a circuit block designating ID sent from the micro computer 8 via the data bus 9 or an exclusive control line. When the ID decoder 01 detects its own circuit block ID, it turns on an input/output port 02 so as to read in control data on the data bus 9.

Read-in data is held in a latch 03 and memorized in a RAM memory 04. An electronic switch SW01 is normally positioned at "Y" contact. The circuit side performs a predetermined process with reference to the RAM 04. The renewal of processing data is carried out in the case where the image receiving condition of the camera is changed and the output data of the auto signal processing circuit 10 is correspondingly changed. In such a case, data is sent from the micro computer 8 together with a discrimination ID and read in according to the previously described procedure.

On the other hand, a ROM memory 05 memorizes standard control data necessary for the circuit block. And, by switching the electronic switch SW01 to the "X" contact, the processing is carried out in accordance with the data in the ROM 05. In this case, the processing of this circuit block is fixed to a standard processing operation regardless of conditions of signals. The control of the switch SW01 can be done by supplying ON/OFF control signals to a terminal 06, therefore its changeover operation can be quite smoothly carried out.

Figure 14:
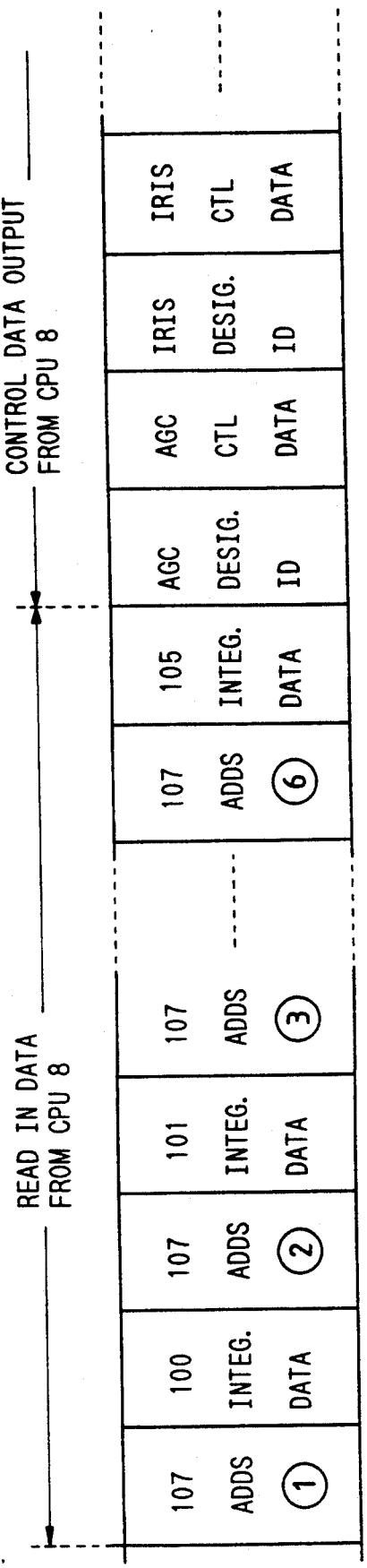
FIG. 14 is a view showing one example of data layout of data bus.

FIG. 14 shows a used condition of the data bus 9. In this manner, the transmission/receipt of control data is carried out by a time-sharing method. However, the micro computer 8 needs to control numerous circuits, and some circuits have large amount of control variables (for example, the gamma correction circuit 508 requires a lot of level and inclination data for approximating a plurality of broken lines.).

Therefore, it would be a problem to require a significantly long time until the system begins its ordinary operation. In order to solve such a disadvantage, the electronic switch SW01 is changed over to the ROM05 side when the data in the system are frequently changed, for example, at the timing shortly after the system has just been turned on. Thus, the system is controlled in accordance with the standard data stored in the ROM 05. It brings a large merit as consumer goods because users can immediately use the system so as not to miss a photographing chance although some unsatisfied points might be included.

As this invention may be embodied in several forms without departing from the spirit of essential characteristics thereof, the present embodiment is therefore illustrative and not restrictive, since the scope of the invention is defined by the appending claims rather than by the description preceding them, and all changes that fall within meets and bounds of the claims, or equivalence of such meets and bounds are therefore intended to embraced by the claims.

What is claimed is:

1. A color camera apparatus comprising:
   an image pickup element having a stripe/mosaic type color filter and photoelectrically converting an arriving optical image into a multiplexed signal including at least a brightness component and a color component;
   an A/D converter for digitizing said multiplexed signal;
   a brightness signal processing circuit for separating the brightness component from the multiplexed signal, said brightness signal processing circuit including a first delay element for delaying a signal by a delay corresponding to two horizontal scanning periods, and for carrying out an aperture correction by use of said first delay element; and
   a color signal processing circuit for separating the color component from the multiplexed signal and for obtaining two line-sequential color difference components, said color signal processing circuit including a second delay element for delaying a signal by a delay corresponding to two horizontal scanning periods, said color signal processing circuit comprising first and second circuit arrangements, said first circuit arrangement carrying out a circular-type noise removal processing by use of said second delay element, and said second circuit arrangement carrying out a rearrangement of said line-sequential color difference components by use of said second delay element.

2. A color camera apparatus in accordance with claim 1, further comprising an arithmetic circuit which receives a plurality of signals from said brightness signal processing circuit and said color signal processing circuit, for performing a predetermined calculation on the basis of said plurality of signals with respect to a whole picture plane and also with respect to each block of divided small segments forming said whole picture plane so as to obtain data representing a picture plane condition during a photographing operation.

3. A color camera apparatus in accordance with claim 2, further including a micro computer which is connected via a data bus to each of said arithmetic circuit, said brightness signal processing circuit, and said color signal processing circuit, for producing various coefficients to be used in said brightness signal processing circuit and said color signal processing circuit on the basis of the data obtained in said arithmetic circuit and received therefrom via said data bus, said micro computer transmitting these coefficients via said data bus to said brightness signal processing circuit and said color signal processing circuit so as to control respective operations.

4. A color camera apparatus in accordance with claim 3, further including memory means for storing reference coefficients representing a standard photographing condition, wherein said brightness signal processing circuit and said color signal processing circuit comprise means for occasionally carrying out respective operations thereof based on said reference coefficients prior to said data obtained in said arithmetic circuit.

5. A color camera apparatus in accordance with claim 1, wherein said brightness signal processing circuit includes a gamma correction circuit applying a gamma correction and an aperture correction circuit receiving an output of the gamma correction circuit.

6. A color camera apparatus comprising:
   an image pickup element having a stripe/mosaic type color filter and photoelectrically converting an arriving optical image into a multiplexed signal including at least a brightness component and a color component;
   an A/D converter for digitizing said multiplexed signal;
   a brightness signal processing circuit for separating the brightness component from the multiplexed signal, said brightness signal processing circuit including delay means for delaying a signal by a delay corresponding to two horizontal scanning periods, and for carrying out an aperture correction by use of said delay means;
   a color signal processing circuit for separating the color component from the multiplexed signal and for obtaining two line sequential color difference components, said color signal processing circuit carrying out a circular-type noise removal processing by use of said delay means, and further carrying out a rearrangement of said line-sequential color difference components by use of said delay means;
   an arithmetic circuit which receives a plurality of signals from said brightness signal processing circuit and said color signal processing circuit, for performing a predetermined calculation on the basis of said plurality of signals with respect to a whole picture plane and also with respect to each block of divided small segments forming said whole picture plane so as to obtain data representing a picture plane condition during a photographing operation; and
   a micro computer which is connected via a data bus to each of said arithmetic circuit, said brightness signal processing circuit, and said color signal processing circuit, for producing various coefficients to be used in said brightness signal processing circuit and said color signal processing circuit on the basis of the data obtained in said arithmetic circuit and received therefrom via said data bus, said micro computer transmitting these coefficients via said data bus to said brightness signal processing circuit and said color signal processing circuit so as to control respective operations, further including memory means for storing reference coefficients representing a standard photographing condition, wherein said brightness signal processing circuit and said color signal processing circuit comprise means for occasionally carrying out respective operations thereof based on said reference coefficients prior to said data obtained in said arithmetic circuit.

7. A color camera apparatus comprising:

an image pickup element having a stripe/mosaic type color filter and photoelectrically converting an arriving optical image into a multiplexed signal including at least a brightness component and a color component;

an A/D converter for digitizing said multiplexed signal;

a brightness signal processing circuit for separating the brightness component from the multiplexed signal, said brightness signal processing circuit including a first delay element for delaying a signal by a delay corresponding to two horizontal scanning periods, and for carrying out an aperture correction by use of said first delay element; and a color signal processing circuit for separating the color component from the multiplexed signal and for obtaining two line sequential color difference components, said color signal processing circuit including a second delay element for delaying a signal by a delay corresponding to two horizontal scanning periods, said color signal processing circuit including first and second circuit arrangements, said first circuit arrangement carrying out a circular-type noise removal processing by use of said second delay element, said second circuit arrangement carrying out a rearrangement of said line-sequential color difference components by use of said second delay element, said color signal processing circuit further including switching means for selectively constituting said first circuit arrangement in response to a control signal.

8. A color camera apparatus in accordance with claim 7, wherein said switching means operates for changing said first circuit arrangement to an interpolation circuit in response to said control signal.

* * * * *